United States Patent [19]

Kurokawa et al.

[11] Patent Number: 5,496,101
[45] Date of Patent: Mar. 5, 1996

[54] PRESSURE CONTROL APPARATUS IN A VEHICLE BRAKING SYSTEM

[75] Inventors: Takashi Kurokawa, Nagoya; Michiharu Nishii, Toyota; Masakazu Sugisawa, Takahama, all of Japan

[73] Assignee: Aisin Seiki Kabushiki Kaisha, Kariya, Japan

[21] Appl. No.: 354,142

[22] Filed: Dec. 6, 1994

[30] Foreign Application Priority Data

Dec. 7, 1993 [JP] Japan ..................... 5-306683

[51] Int. Cl.$^6$ ..................................... B60T 8/58
[52] U.S. Cl. ................ 303/125; 188/358; 303/113.3; 303/116.1; 303/119.2; 303/117.1; 303/15
[58] Field of Search ............... 303/113.3, 113.2, 303/113.4, 114.1, 114.2, 93, 114.3, 100, 119.1, 116.1, 117.1, 15, 10, 20, 13–14, DIG. 1, DIG. 2, DIG. 3, DIG. 4, 119.2; 60/545, 547.1, 565, 566; 188/358, 359; 180/169; 91/433, 459; 251/129.08; 137/596.17

[56] References Cited

U.S. PATENT DOCUMENTS

| | | | |
|---|---|---|---|
| 3,898,913 | 8/1975 | Hendrickson et al. | |
| 4,874,207 | 10/1989 | Nishii et al. | 303/10 X |
| 4,902,075 | 2/1990 | Uno et al. | 60/545 X |
| 4,934,762 | 6/1990 | Sato. | |
| 5,106,170 | 4/1992 | Matsuda et al. | 303/113.2 |
| 5,188,436 | 2/1993 | Devall | 303/113.2 |
| 5,244,260 | 9/1993 | Kervagoret | 303/113.2 |
| 5,273,348 | 12/1993 | Yagi et al. | 303/119.2 |

FOREIGN PATENT DOCUMENTS

| | | |
|---|---|---|
| 0369412 | 5/1990 | European Pat. Off. . |
| 58-80800 | 5/1983 | Japan . |
| 2-175361 | 7/1990 | Japan . |

*Primary Examiner*—Douglas C. Butler
*Attorney, Agent, or Firm*—Burns, Doane, Swecker & Mathis

[57] ABSTRACT

The invention is directed to a pressure control apparatus in a vehicle braking system which has a wheel cylinder operatively mounted on a wheel, a reservoir for storing an amount of brake fluid, and a master cylinder for receiving the brake fluid from the reservoir and generating a master cylinder pressure in response to depression of a brake pedal. The pressure control apparatus includes a housing which defines therein a pressure chamber which communicates with the wheel cylinder, and a control device which is actuated by a current fed thereto for providing a set pressure in response to the current and regulating the pressure in the pressure chamber into the set pressure. The apparatus further includes a valve device, by which the pressure in the pressure chamber is increased when the master cylinder pressure is higher than the pressure in the pressure chamber, or when the set pressure is higher than the pressure in the pressure chamber, while the pressure in the pressure chamber is decreased when the master cylinder pressure is lower than the pressure in the pressure chamber, or when the set pressure is lower than the pressure in the pressure chamber.

9 Claims, 5 Drawing Sheets

PRESSURE CONTROL APPARATUS IN A VEHICLE BRAKING SYSTEM

BACKGROUND OF THE INVENTION

1. Field of the Invention

The present invention relates to a pressure control apparatus in a vehicle braking system having a master cylinder which generates a hydraulic pressure in response to depression of a brake pedal.

2. Description of the Prior Art

In general, a hydraulic braking system for an automotive vehicle is provided with a master cylinder for generating a master cylinder pressure in response to depression of a brake pedal, a reservoir for supplying a brake fluid to the master cylinder, and a wheel cylinder for braking a wheel of the vehicle with the master cylinder pressure, as disclosed in Japanese Patent Laid-open publication No. 2-175361, for example. Between the master cylinder and the wheel cylinder, is filled the brake fluid which is supplied from the reservoir. When the brake pedal is depressed, a pressure chamber in the master cylinder is pressurized to generate the master cylinder pressure, and transmit it to the wheel cylinder, which applies a braking force to the wheel to stop the vehicle.

In contrast to the above ordinary braking system, it has been proposed to provide an apparatus for braking a vehicle automatically without depressing the brake pedal, as disclosed in Japanese Patent Laid-open publication No. 58-80800, for example. This apparatus is normally used for preventing the vehicle from slipping, or used for braking the vehicle automatically to keep a certain distance in front of the vehicle from other vehicles. In that apparatus, there is provided a pressure supply device such as an accumulator for accumulating a pressurized brake fluid, or a fluid pump for pressurizing the brake fluid, and discharging it to the wheel cylinder.

According to the vehicle having the above automatic braking apparatus, however, in the case where the braking force is applied to the wheel without depressing the brake pedal, i.e., during the automatic braking operation, if the brake pedal is depressed, the braking operation may not be made in response to depression of the brake pedal, or the braking force applied to the wheel may change abruptly.

SUMMARY OF THE INVENTION

Accordingly, it is an object of the present invention to provide a pressure control apparatus in a hydraulic braking system which provides a braking force generated in response to depression of a brake pedal and a braking force generated in an automatic braking operation, such that no feeling of physical disorder will be caused to a driver, even if the brake pedal is depressed by him during the automatic braking operation.

In accomplishing the above and other objects, a pressure control apparatus according to the present invention is installed in a vehicle braking system which has a wheel cylinder operatively mounted on a road wheel, a reservoir for storing an amount of brake fluid, and a master cylinder for receiving the brake fluid from the reservoir and generating a master cylinder pressure in response to depression of a brake pedal and supplying the master cylinder pressure to the wheel cylinder. The pressure control apparatus includes a housing which defines therein a pressure chamber which communicates with the wheel cylinder, and includes a control device which is actuated by a current fed thereto for providing a set pressure in response to the current and regulating the pressure in the pressure chamber into the set pressure. The apparatus further includes a valve device which is provided for increasing the pressure in the pressure chamber when the master cylinder pressure is higher than the pressure in the pressure chamber, or when the set pressure is higher than the pressure in the pressure chamber, while decreasing the pressure in the pressure chamber when the master cylinder pressure is lower than the pressure in the pressure chamber, or when the set pressure is lower than the pressure in the pressure chamber.

The pressure control apparatus is preferably employed in a vehicle braking system further including a power pressure source for receiving the brake fluid from the reservoir and discharging a power pressure. Preferably, the apparatus includes a housing, which defines therein a bore, with a first port connected to the reservoir and a second port connected to the power pressure source. A first sliding member is slidably disposed in the bore of the housing to divide the bore into an input chamber which communicates with the master cylinder to receive the master cylinder pressure and a pressure chamber which communicates with the wheel cylinder and supplies a hydraulic pressure thereto. The first sliding member is arranged to slide in response to a difference between the pressure in the input chamber and the pressure in the pressure chamber. The first sliding member has a bore defined axially therein and a closed end. And, the first sliding member has a first drain port which communicates with the first port of the housing and a first power port which communicates with the second port of the housing. Then, a second sliding member is slidably received in the bore of the first sliding member. The second sliding member has a second drain port which selectively communicates with the first drain port in accordance with the relative position of the second sliding member to the first sliding member, and a second power port which selectively communicates with the first power port in accordance with the relative position of the second sliding member to the first sliding member. The second sliding member has a through hole which is defined along its longitudinal axis to communicate the pressure chamber with a space defined between the first sliding member and the second sliding member. The through hole communicates with the second drain port and the second power port. Furthermore, there is provided a solenoid device which has a solenoid and a plunger which is engaged with the second sliding member, and which is actuated by a current fed to the solenoid. The solenoid device provides a set pressure in response to the current and actuates the plunger to move the second sliding member toward or away from the closed end of the first sliding member to regulate the pressure in the pressure chamber into the set pressure.

BRIEF DESCRIPTION OF THE DRAWINGS

The above stated object and following description will become readily apparent with reference to the accompanying drawings in which.

DESCRIPTION OF THE PREFERRED EMBODIMENTS

Figure 1:
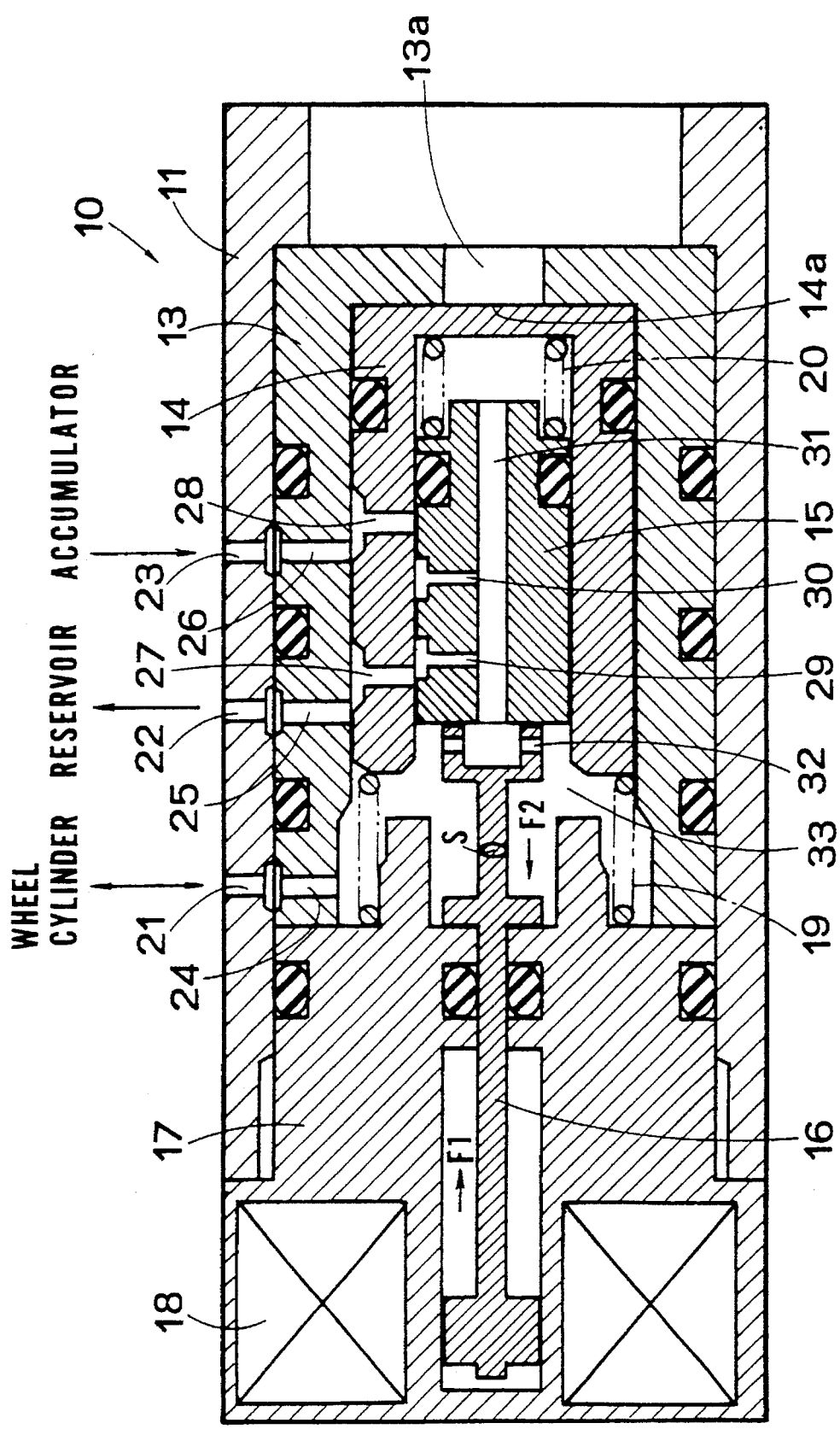
FIG. 1 is a sectional view of a pressure control apparatus of an embodiment of the present invention.

Referring to FIG. 1, there is illustrated an embodiment of a pressure control apparatus 10 according to the present invention. The pressure control apparatus 10 has a cylindrical housing 11, a cylindrical fixed member 13, a first sliding member 14, a second sliding member 15, and a yoke 17 of a linear solenoid 18. The fixed member 13 has a bottom with a hole 13a, and is fluid-tightly fitted into the housing 11, such that the inside of the fixed member 13 communicates with an open end of the housing 11 through the hole 13a. The open end of the housing 11 is connected to a master cylinder (not shown in FIG. 1 but indicated by 42 in FIG. 3). The first sliding member 14 is formed in the shape of a cylinder with a closed end 14a, and slidably fitted into the fixed member 13, with the closed end 14a facing with the hole 13a. The second sliding member 15 is formed in the shape of a piston having a through hole 31 along the longitudinal axis of the piston, and slidably fitted into the first sliding member 14. A spring 20 is received in the first sliding member 14, and mounted between the closed end 14a and the second sliding member 15 to bias the second sliding member 15 toward the yoke 17 relative to the first sliding member 14. Also, a spring 19 is mounted between the yoke 17 and the open end of the first sliding member 14 to bias the first sliding member 14 toward the hole 13a of the fixed member 13. The yoke 17 is plugged into the housing 11 from the other open end thereof at the left side in FIG. 1, and secured to the housing 11. The linear solenoid 18 is provided with a plunger 16 which is supported movably along the longitudinal axis of the yoke 17, and around which a coil of the solenoid 18 is provided. An end portion of the plunger 16 is arranged to contact an end face (the left end face in FIG. 1) of the second sliding member 15. When a current is fed to the solenoid 18, the plunger 16 is actuated to push the second sliding member 15 toward the closed end 14a.

The inside of the fixed member 13 is, therefore, divided by the first sliding member 14 into a pressure chamber 33 of a variable volume and an input chamber according to the present invention which is applied with a master cylinder pressure, as described later. The pressure chamber 33 communicates with a wheel cylinder (not shown in FIG. 1, but indicated by 55, 56 in FIG. 3) through a port 24 which is provided in the fixed member 13, and a port 21 which is provided in the housing 11. The housing 11 and the fixed member 13 have a port 23 and a port 26 respectively, which communicate with an accumulator (not shown in FIG. 1, but indicated by 49 in FIG. 3), and also have a port 22 and a port 25 respectively, which communicate with a reservoir (not shown in FIG. 1, but indicated by 47 in FIG. 3). The first sliding member 14 has a first drain port 27 which is radially defined and formed with a groove on the outer surface of the first sliding member 14 along the longitudinal axis thereof so as to always communicate with the port 25. Also, the first sliding member 14 has a first power port 28 which is radially defined and formed with a groove on the outer surface of the first sliding member 14 along the longitudinal axis thereof so as to always communicate with the port 26. Therefore, the first drain port 27 is held to communicate with the reservoir and the first power port 28 is held to communicate with the accumulator, irrespective of the sliding movement of the first sliding member 14 relative to the fixed member 13.

The second sliding member 15 has a second drain port 29 and a second power port 30 which are defined radially to communicate with the through hole 31, and formed with grooves on the outer surface of the second sliding member 15 along the longitudinal axis thereof, so as to selectively provide a communication between the first and second drain ports 27 and 29, or a communication between the first and second power ports 28 and 30. In the normal condition as shown in FIG. 1, for instance, the first drain port 27 and the second drain port 29 are positioned to communicate with each other. When the second sliding member 15 slides toward the closed end 14a of the first sliding member 14, the communication between the first drain port 27 and the second drain port 29 is blocked. When the second sliding member 15 slides further in the same direction, the first power port 28 and the second power port 30 communicate with each other. In the case where the second sliding member 15 is positioned as shown in FIG. 1, however, if the first sliding member 14 slides toward the yoke 17, the first power port 28 and the second power port 30 communicate with each other, while the communication between the first drain port 27 and the second drain port 29 is blocked. The through hole 31 of the second sliding member 15 is arranged to communicate with the pressure chamber 33 through a hole 32 defined in the end portion of the plunger 16 which contacts the end face of the first sliding member 15.

Figure 2:
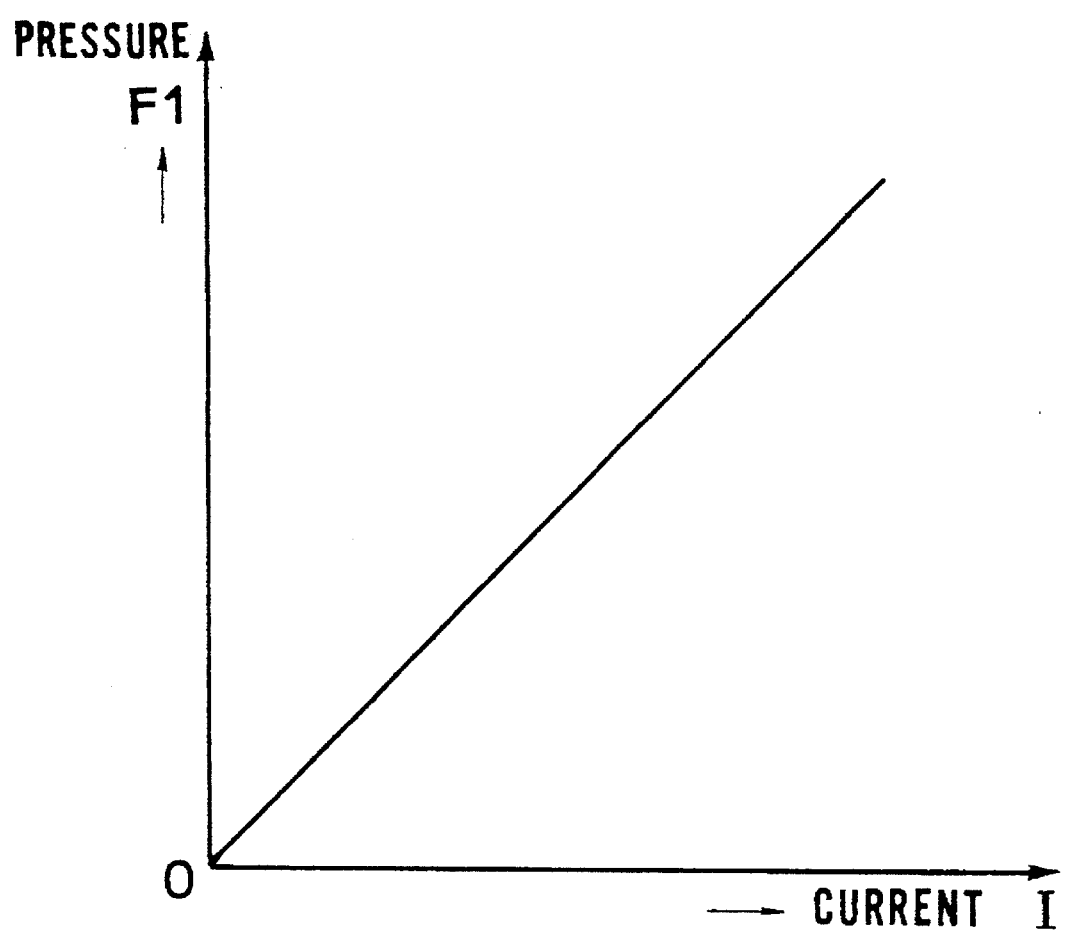
FIG. 2 is a graph illustrating the relationship between a current of a solenoid and a pressure exerted thereby according to the present invention.

Since the relationship between a force F1 applied onto the plunger 16 and the current fed to the linear solenoid 18 is proportional as shown in FIG. 2, the more the current is increased, the more the force pushing the plunger 16 toward the second sliding member 15 is increased. Referring to FIG. 1, therefore, if the master cylinder pressure is zero, and the current fed to the linear solenoid 18 is zero, the first sliding member 14 is biased toward the opening 13a of the fixed member 13 by the spring 19, and the second sliding member 15 is biased in the opposite direction, i.e, toward the yoke 17, so that the first sliding member 14 and the second sliding member 15 are held to be positioned as shown in FIG. 1. In this condition, the port 21, which communicates with the wheel cylinder, communicates with the reservoir through the pressure chamber 33, then the through hole 31, the second drain port 29, the first drain port 27, the port 25 and the port 22. Consequently, the pressure in the wheel cylinder is decreased.

In operation, when the linear solenoid 18 is fed with a predetermined amount of current, the plunger 16 is actuated to push the second sliding member 15 toward the closed end 14a of the first sliding member 14, whereby the communication between the first drain port 27 and the second drain port 29 is blocked. Against the plunger 16, therefore, is applied a compound force F2 of a force which is proportional to a sectional area as indicated by "S" in FIG. 1 and a force biased by the spring 20. When the second sliding member 15 is actuated to move further toward the closed end 14a of the first sliding member 14 until the first power port 28 and the second power port 30 communicate with each other, the pressure in the pressure chamber 33 is increased, so that the plunger 16 is forced to move back toward the yoke 17. Thus, the second sliding member 15 is controlled to slide in the first sliding member 14, such that the compound force F2 of the pressure within the pressure chamber 33 and the biasing force of the spring 20 balances with the force F1 applied in response to the current fed to the linear solenoid 18, and therefore the pressure in the pressure chamber 33 is regulated in response to the current fed to the solenoid 18.

On the contrary, when a brake pedal (not shown in FIG. 1, but indicated by 40 in FIG. 3) is depressed to increase the master cylinder pressure more than a compound force of the biasing force of the spring 19 and the force F1 applied by the solenoid 18 in response to the current, the first sliding member 14 is forced to move toward the yoke 17. In this condition, when the first sliding member 14 moves toward the yoke 17 until the first power port 28 and the second power port 30 communicate with each other, the pressure in the pressure chamber 33 is increased, so that the first sliding member 14 is forced to move back toward the hole 13a of the fixed member 13. Thus, the first sliding member 14 is controlled to slide in the fixed member 13, such that the pressure in the pressure chamber 33 balances with the master cylinder pressure, and therefore the pressure in the pressure chamber 33 is regulated in response to the master cylinder pressure.

As described above, the pressure in the pressure chamber 33 is regulated into the larger pressure between the master cylinder pressure and the pressure balancing with the force F1 applied in response to the current fed to the solenoid 18. As a result, the wheel cylinder pressure can be increased by depressing the brake pedal, and also increased by supplying a predetermined current to the solenoid 18. According to the present embodiment as described above, the open end of the housing 11 is connected to the master cylinder, such that the master cylinder pressure is applied to the outer surface of the closed end 14a of the first sliding member 14. Furthermore, a master cylinder piston (not shown in FIG. 1) is preferably provided with a protrusion (not shown) which can pass through the hole 13a of the fixed member 13 to abut on the closed end 14a of the first sliding member 14, so that the piston can directly push the first sliding member 14. Thus, in the case where any defects have been caused in the master cylinder system, the pressure may be generated from the port 21 in accordance with the depressing force of the brake pedal.

Figure 3:
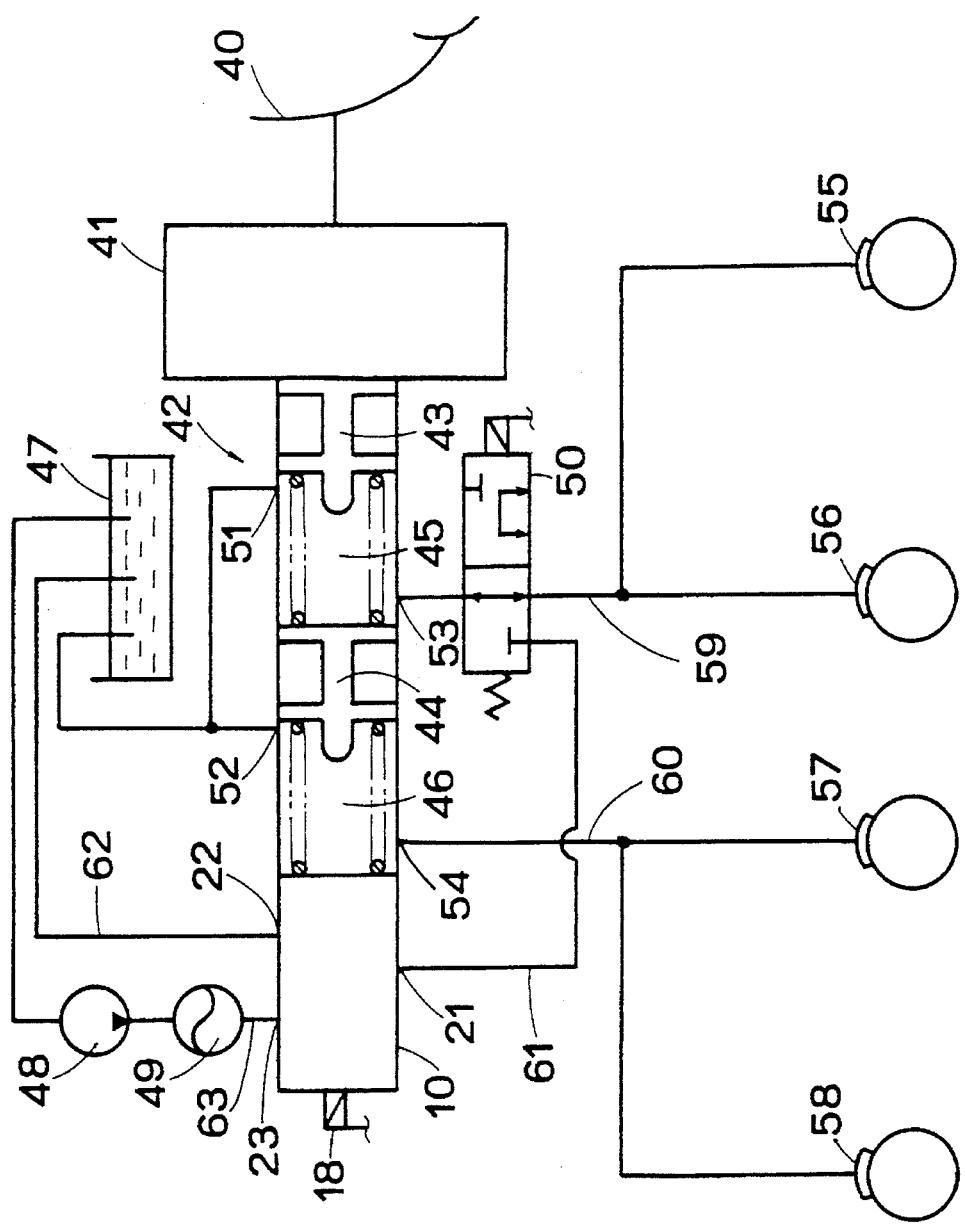
FIG. 3 is a schematic illustration of a first embodiment of a vehicle braking system employing the pressure control apparatus according to the present invention.

FIG. 3 illustrates a first embodiment of a vehicle braking system employing the above-described pressure control apparatus 10. The pressure control apparatus 10 is connected to a tandem master cylinder 42 which has a first piston 43 and a second piston 44 for defining a first pressure chamber 45 and a second pressure chamber 46, respectively. The first piston 43 is connected to a booster 41 and actuated thereby in response to depression of the brake pedal 40. A reservoir 47 is provided for supplying a brake fluid to the first and second pressure chambers 45, 46 through ports 51, 52, respectively. The second pressure chamber 46 communicates with the input chamber including the hole 13a in the fixed member 13 of the pressure control apparatus 10 as shown in FIG. 1. The port 22 of the apparatus 10 is connected to the reservoir 47 by a passage 62. The port 23 of the apparatus 10 is connected by a passage 63 to an accumulator 49, which constitutes a power pressure source with a fluid pump 48 which is connected to the reservoir 47 at its inlet side, and connected to an accumulator 49 at its discharging side.

The first pressure chamber 45 is connected to a first changeover valve 50 through a port 53. The first changeover valve 50 is connected by a passage 59 to wheel cylinders 55 and 56 which are operatively mounted on driven wheels. The changeover valve 50 is a three ports—two positions solenoid valve which can be selectively positioned in a first position for communicating the first pressure chamber 45 with a passage 59, or a second position for communicating the port 21 of the pressure control apparatus 10 with the passage 59 through a passage 61. The second pressure chamber 46 is connected to wheel cylinders 57 and 58 which are operatively mounted on non-driven wheels respectively, through the port 54 and a passage 60 as shown in FIG. 1.

According to the first embodiment as constituted above, the changeover valve 50 is normally positioned to communicate the first pressure chamber 45 with the wheel cylinders 55, 56 through the passage 59. When the brake pedal 40 is depressed, the first piston 43 is moved forward, so that the pressure in the first pressure chamber 45 is increased. At the same time, the second piston 44 is moved forward, so that the pressure in the second pressure chamber 46 is increased. Since the wheel cylinders 55, 56 communicate with the first pressure chamber 45 in the condition as shown in FIG. 1 and the wheel cylinders 57, 58 communicate with the second pressure chamber 46, all the wheels are applied with the braking force in response to depression of the brake pedal 40.

In the case where the wheels are to be applied with the braking force while the brake pedal 40 is not depressed, the changeover valve 50 is changed over to the second position in which the passage 59 communicates with the passage 61 and the port 21 of the pressure control apparatus 10. In this case, the pressure discharged from the port 21 is regulated in response to the current fed to the solenoid 18. Thus, the wheel cylinders 55, 56 communicate with the port 21, so that the braking force applied to the driven wheels with the wheel cylinders 55, 56 can be regulated in response to the current fed to the solenoid 18. In the case where the brake pedal 40 is depressed in this condition, the pressure in the pressure chamber 46 is increased to act on the pressure control apparatus 10. As a result, the pressure of the brake fluid discharged from the port 21 is regulated in accordance with the relationship with the current fed to the solenoid 18 and the master cylinder pressure (i.e., the pressure in the second pressure chamber 46). Therefore, if the brake pedal 40 is depressed by a larger force than the force applied by the solenoid 18, the braking force applied to the driven wheels can be made larger.

Figure 4:
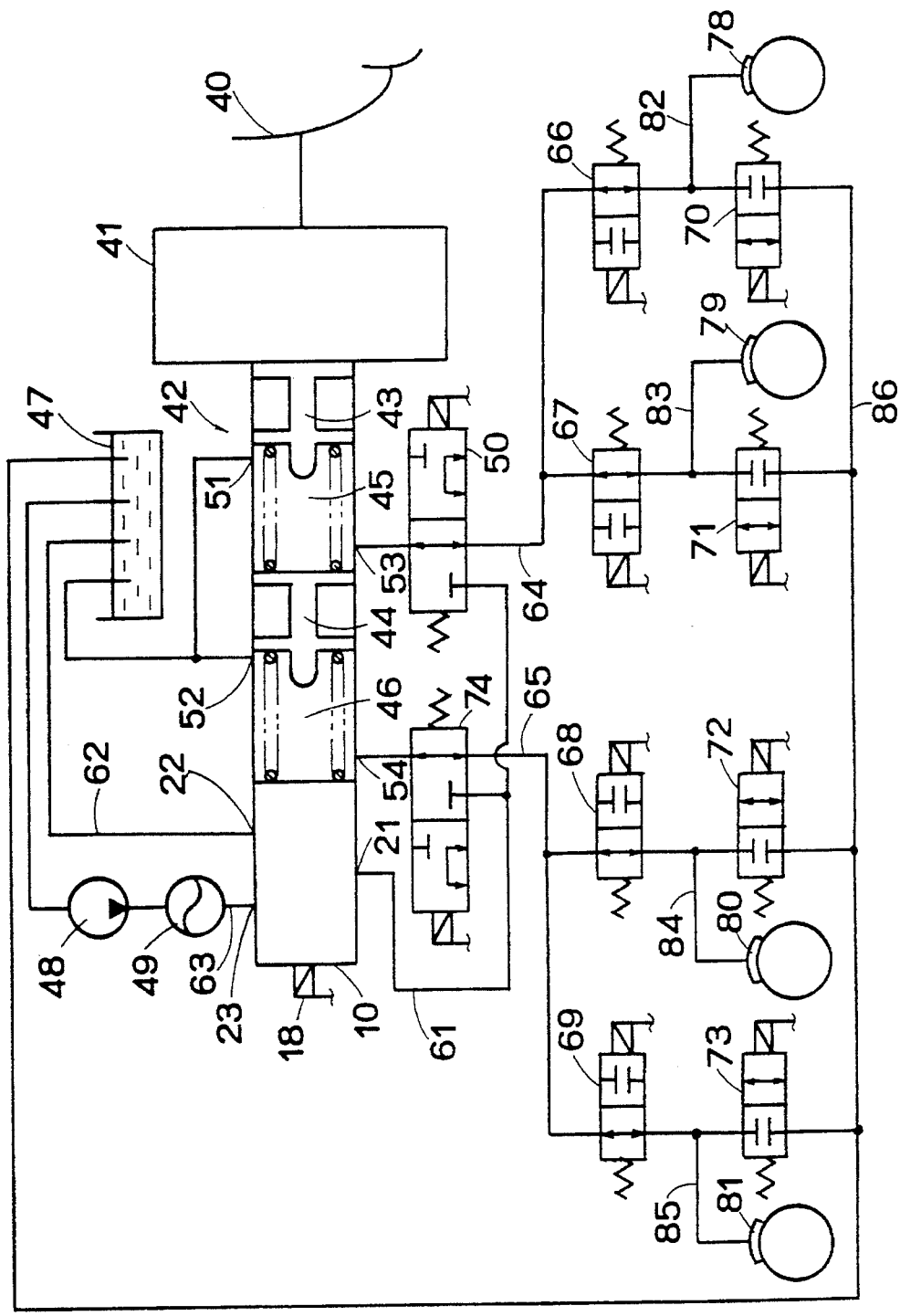
FIG. 4 is a schematic illustration of a second embodiment of a vehicle braking system employing the pressure control apparatus according to the present invention.

FIG. 4 illustrates a second embodiment of the vehicle braking system employing the above-described pressure control apparatus 10, which system further includes an anti-skid control system for preventing the wheels from skidding during the braking operation. According to the second embodiment, the master cylinder 42 is the same as that in the first embodiment, but further includes a changeover valve 74 and switching valves 66 to 69 and 70 to 73, which are normally open, and normally closed, respectively, and which are connected to the wheel cylinders 78 to 81. The port 54 of the master cylinder 42 is connected to the changeover valve 74, which is connected to the switching valves 68, 69 through the passage 65. Also, the port 21 of the pressure control apparatus 10 is connected to the changeover valves 50 and 74 through the passage 61.

That is, the passage 64 is connected to the wheel cylinder 78 through the normally open switching valve 66 and a passage 82. The wheel cylinder 78 communicates with the reservoir 47 through the normally closed switching valve 70 and a passage 86. The passage 64 is connected to the wheel cylinder 79 through the normally closed switching valve 67 and a passage 83. The wheel cylinder 79 is connected to the reservoir 47 through the normally closed switching valve 71 and the passage 86. The passage 65 is connected to the wheel cylinder 80 through the normally closed switching valve 68 and a passage 84. The wheel cylinder 80 is connected to the reservoir 47 through the normally closed switching valve 72 and the passage 86. The passage 65 is connected to the wheel cylinder 81 through the normally closed switching valve 69 and a passage 85. The wheel cylinder 81 is connected to the reservoir 47 through the normally closed switching valve 73 and the passage 86.

In operation, with the above-described switching valves 66 to 69 and 70 to 73 alternately opened or closed, respectively, the pressure in each of the wheel cylinders 78 to 81 is regulated as desired. As a result, the braking force of each wheel is regulated, so that the anti-skid control operation may be performed every each wheel. The braking force applied to the left and right wheels of the driven wheels may be regulated independently from each other.

Figure 5:
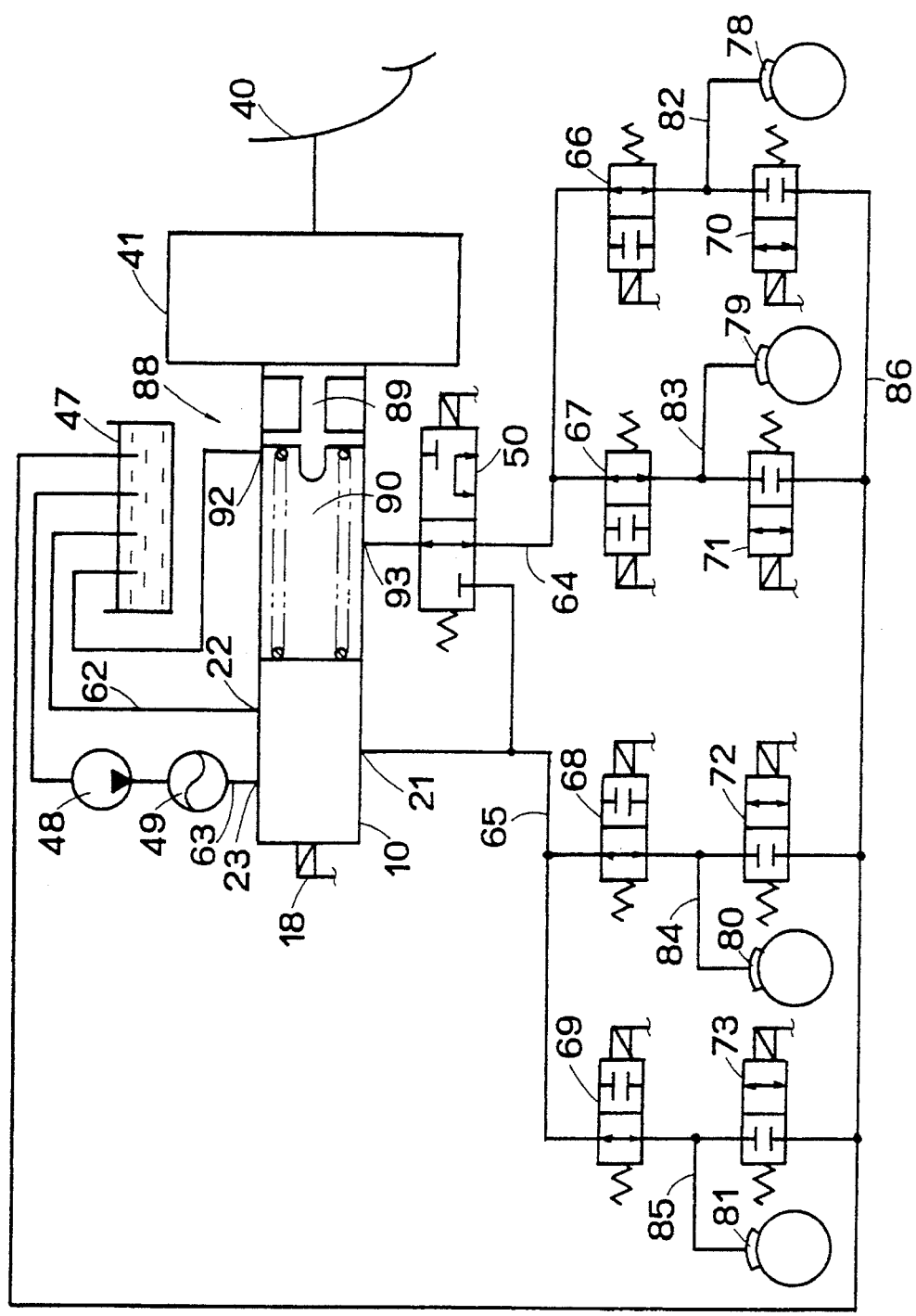
FIG. 5 is a schematic illustration of a third embodiment of a vehicle braking system employing the pressure control apparatus according to the present invention.

FIG. 5 illustrates a third embodiment of the vehicle braking system employing the above-described pressure control apparatus 10. In the third embodiment, a master cylinder 88 is different from the master cylinder 42 in the previous embodiments. The master cylinder 88 is provided with a master piston 89 which defines a single pressure chamber 90 in the master cylinder 88. The pressure chamber 90 communicates with the reservoir 47 through a port 92. The piston 89 is connected to the brake booster 41 and actuated thereby in response to depression of the brake pedal 40. When the brake pedal 40 is depressed, the brake booster 41 acts on the piston 89 to push the same toward the apparatus 10. The pressure chamber 90 communicates with the changeover valve 50 through a port 93. The port 21 of the pressure control apparatus 10 is connected to the changeover valve 50.

According to the third embodiment of the vehicle braking system as shown in FIG. 5, when the brake pedal 40 is depressed, the piston 89 is moved forward, the pressure in the pressure chamber 90 is increased, so that the pressure in the wheel cylinder 78 or 79 is increased through the switching valve 66 or 67. At the same time, the increased pressure in the pressure chamber 90 acts on the pressure control apparatus 10. As a result, the pressure discharged from the port 21 becomes equal to the master cylinder pressure, so that the pressure in the wheel cylinder 80 or 81 is increased. In this condition, when the changeover valve 50 is changed over to the second position in which the port 21 is connected to the wheel cylinder 78 or 79 through the switching valve 66 or 67, the braking force is regulated in accordance with the relationship between the current fed to the solenoid 18 and the master cylinder pressure.

As described above, according to the embodiments of the present invention, in the vehicle braking system which is provided with the master cylinders 42, 88 for generating the master cylinder pressure in response to depression of the brake pedal 40, the pressure control apparatus 10 includes the pressure chamber 33 which communicates directly or indirectly with the wheel cylinders 55 to 58, or 78 to 81, the first sliding member 14 which slides in response to the pressure difference between the master cylinder pressure and the pressure in the pressure chamber 33, the second sliding member 15 which slides in response to the pressure difference between the set pressure provided in response to the current fed to the solenoid 18 and the pressure in the pressure chamber 33, and means for increasing the pressure in the pressure chamber 33 when the master cylinder pressure is higher than the pressure in the pressure chamber 33, or when the set pressure is higher than the pressure in the pressure chamber 33, and decreasing the pressure in the pressure chamber 33 when the master cylinder pressure is lower than the pressure in the pressure chamber 33, or when the set pressure is lower than the pressure in the pressure chamber 33. Consequently, the wheel cylinder pressure may be increased in accordance with the set pressure, and may be increased more than the set pressure when the brake pedal 40 is depressed further.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A pressure control apparatus in a vehicle braking system having a wheel cylinder operatively mounted on a road wheel, a reservoir for storing an amount of brake fluid, and a master cylinder for receiving the brake fluid from said reservoir and for generating a master cylinder pressure in response to depression of a brake pedal to supply the master cylinder pressure to said wheel cylinder, comprising:

a housing for defining therein a pressure chamber which communicates with said wheel cylinder;

control means actuated by a current fed thereto for providing a set pressure in response to the current and for regulating the pressure in said pressure chamber to the set pressure;

valve means for increasing the pressure in said pressure chamber when the master cylinder pressure is higher than the pressure in said pressure chamber, or when the set pressure is higher than the pressure in said pressure chamber, said valve means decreasing the pressure in said pressure chamber when the master cylinder pressure is lower than the pressure in said pressure chamber, or when the set pressure is lower than the pressure in said pressure chamber;

a power pressure source for receiving the brake fluid from said reservoir and discharging a power pressure to said housing, said housing having a first port connected to said reservoir and a second port connected to said power pressure source, said valve means selectively communicating said first port with said pressure chamber to decrease the pressure therein and communicating said second port with said pressure chamber to increase the pressure therein; and said valve means including a first sliding member slidably disposed in said housing, said first sliding member sliding in response to a difference between the master cylinder pressure and the pressure in said pressure chamber, and said first sliding member having a bore defined axially therein and a closed end, a second sliding member slidably received in said bore of said first sliding member, said pressure chamber being selectively communicated with said first port and said second port in accordance with the relative position of said second sliding member to said first sliding member, and said second sliding member being actuated by said control means to move toward or away from the closed end of said first sliding member.

2. A pressure control apparatus as set forth in claim 1, wherein said power pressure source comprises a fluid pump for sucking the brake fluid from said reservoir and discharging a pressurized fluid, and an accumulator connected to said fluid pump for accumulating the pressurized fluid to supply said power pressure to said second port of said housing.

3. A pressure control apparatus as set forth in claim 2, wherein said first sliding member is applied with the master cylinder pressure at the outer surface of the closed end of said first sliding member.

4. A pressure control apparatus as set forth in claim 3, wherein said first sliding member is engageable with said master cylinder to directly contact therewith at the closed end of said first sliding member.

5. A pressure control apparatus as set forth in claim 3, wherein said control means includes solenoid means having a solenoid and a plunger which is engaged with said second sliding member and actuated by a current fed to said solenoid, said solenoid means providing a set pressure in response to the current and actuating said plunger to move said second sliding member toward or away from the closed end of said first sliding member to regulate the pressure in said pressure chamber into the set pressure.

6. A pressure control apparatus in a vehicle braking system having a wheel cylinder operatively mounted on a road wheel, a reservoir for storing an amount of brake fluid, a master cylinder for receiving the brake fluid from said reservoir and generating a master cylinder pressure in response to depression of a brake pedal to supply the master cylinder pressure to said wheel cylinder, and a power pressure source for receiving the brake fluid from said reservoir and discharging a power pressure, comprising:

a housing for defining therein a bore and having a first port connected to said reservoir and a second port connected to said power pressure source;

a first sliding member slidably disposed in said bore of said housing for dividing said bore into an input chamber which communicates with said master cylinder to receive the master cylinder pressure and a pressure chamber which communicates with said wheel cylinder and supplies a hydraulic pressure thereto, said first sliding member sliding in response to a difference between the pressure in said input chamber and the pressure in said pressure chamber, said first sliding member having a bore defined axially therein and a closed end, and said first sliding member having a first drain port which communicates with said first port of said housing and a first power port which communicates with said second port of said housing;

a second sliding member slidably received in said bore of said first sliding member, said second sliding member having a second drain port which selectively communicates with said first drain port in accordance with the relative position of said second sliding member to said first sliding member, and a second power port which selectively communicates with said first power port in accordance with the relative position of said second sliding member to said first sliding member, said second sliding member having a through hole defined along a longitudinal axis thereof to communicate said pressure chamber with a space defined between said first sliding member and said second sliding member, said through hole communicating with said second drain port and said second power port; and solenoid means having a solenoid and a plunger engaged with said second sliding member and actuated by a current fed to said solenoid, said solenoid means providing a set pressure in response to the current and actuating said plunger to move said second sliding member toward or away from the closed end of said first sliding member to regulate the pressure in said pressure chamber into the set pressure.

7. A pressure control apparatus as set forth in claim 6, wherein said first sliding member is biased by a first spring to expand the volume of said pressure chamber, and wherein said second sliding member is biased by a second spring disposed in said first sliding member to move away from the closed end of said first sliding member.

8. A pressure control apparatus as set forth in claim 6, wherein said solenoid means further comprises a yoke which plugs the bore of said housing to define said pressure chamber with said first sliding member, and which supports said plunger to slide on the same axis as the sliding axis of said second sliding member.

9. A pressure control apparatus as set forth in claim 8, wherein said first sliding member is engageable with said master cylinder to directly contact therewith at the closed end of said first sliding member.

\* \* \* \* \*